Dec. 29, 1925.

H. G. COLE

BRAKE

Filed Feb. 8, 1924

Harry G. Cole
INVENTOR

BY Victor J. Evans
ATTORNEY

WITNESS:

Dec. 29, 1925.                                    1,567,915
                    H. G. COLE
                      BRAKE
              Filed Feb. 8, 1924        2 Sheets-Sheet 2
Fig. 4.                           Fig. 5.
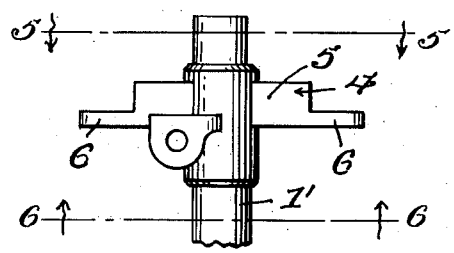
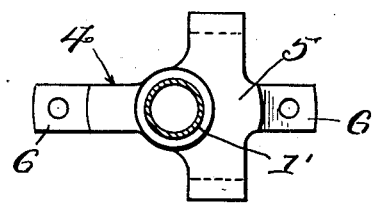
Fig. 6.
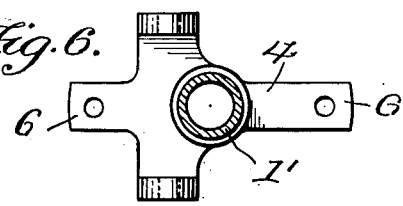
Fig. 7.
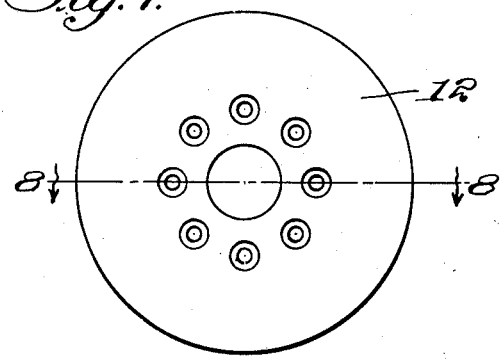
Fig. 8.
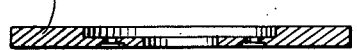
Fig. 10.
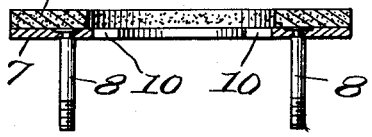
Fig. 9.
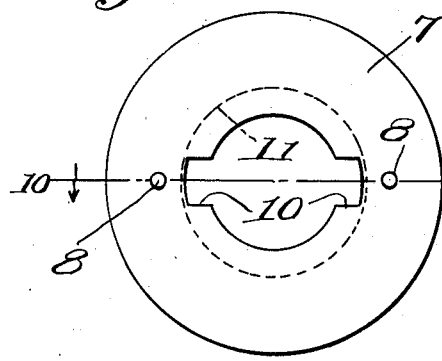
Fig. 11.
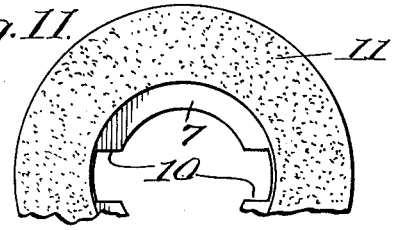
Harry G. Cole
                    INVENTOR
          BY  Victor J. Evans
                    ATTORNEY
J. L. Wright
WITNESS:

Patented Dec. 29, 1925.

1,567,915

UNITED STATES PATENT OFFICE.

HARRY GORDON COLE, OF WESTERNPORT, MARYLAND.

BRAKE.

Application filed February 8, 1924. Serial No. 691,529.

*To all whom it may concern:*

Be it known that I, HARRY G. COLE, a citizen of the United States, residing at Westernport, in the county of Allegany and State of Maryland, have invented new and useful Improvements in Brakes, of which the following is a specification.

This invention relates to brakes for motor vehicles and the like, the general object of the invention being to provide a disc-shaped brake with spring means for normally holding one part thereof out of engagement with the other part, so that the wheel has free movement without interference from the brake, with means for pushing one part against the other part to set up the braking action.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 4 is a view of the supporting means on the housing.

Figure 1:
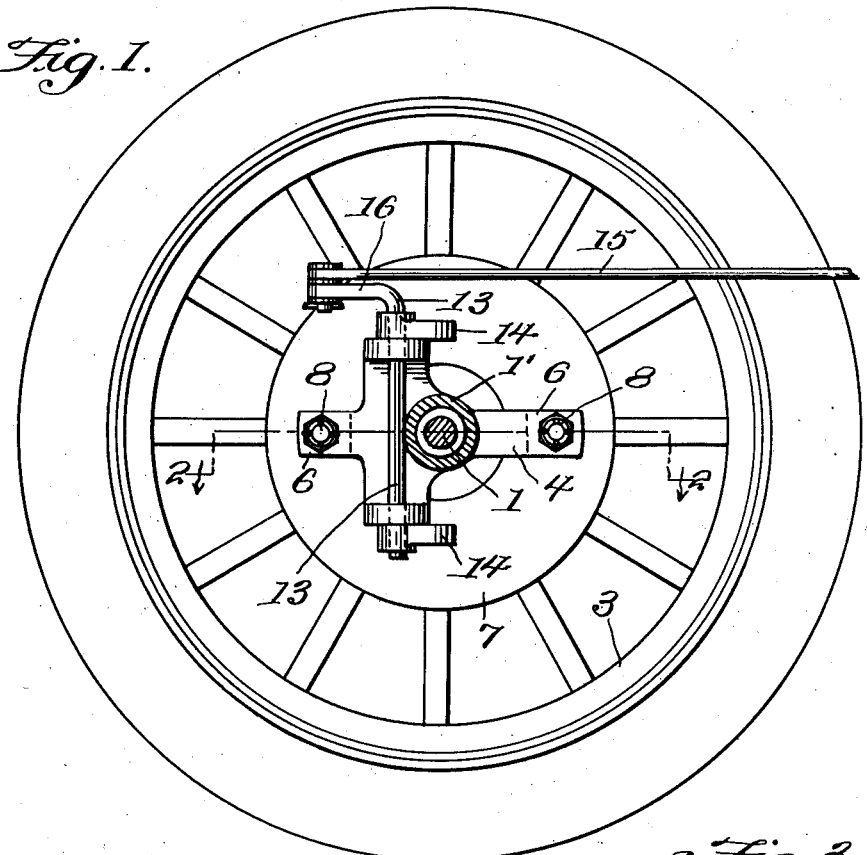
Figure 1 is a rear face view of a wheel showing my improved brake.
Figures 2, 3:
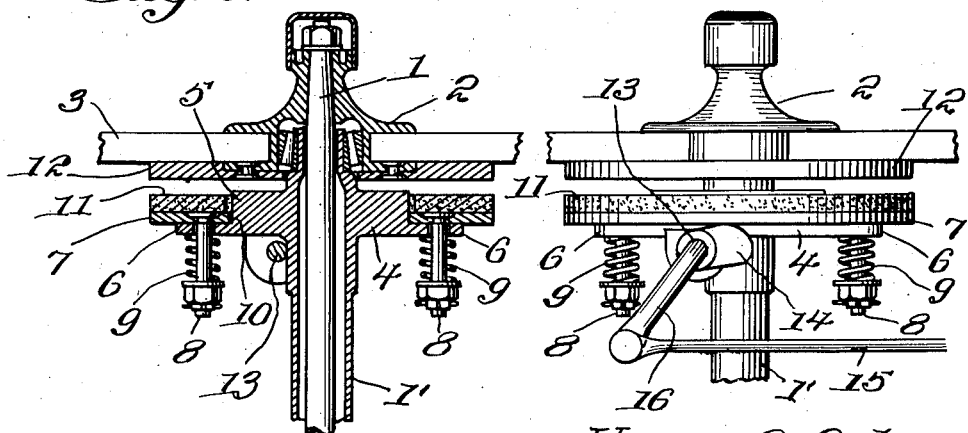
Figure 2 is a section on line 2—2 of Figure 1.
Figure 3 is a plan view.

Figue 5 is a section on line 5—5 of Figure 4.

Figure 6 is a section on line 6—6 of Figure 4.

Figure 7 is a view of the brake disc which is carried by the wheel.

Figure 8 is a section on line 8—8 of Figure 7.

Figure 9 is a view of the brake disc carried by the housing.

Figure 10 is a section on line 10—10 of Figure 9.

Figure 11 is an outer face view of Figure 9.

In these views, 1 indicates the rear axle of a vehicle, 1' the housing thereof and 2 indicates the hub of a wheel which is arranged to rotate with the axle, 3 indicating the rest of the wheel. In carrying out my invention, I place a cross piece 4 on the axle housing which is provided with a thick center, as shown at 5 which leaves the reduced end parts 6. A disc 7 is movably supported on the cross piece by the bolts 8 which pass through the reduced parts 6 and which have springs 9 thereon for holding the disc against said reduced parts. The inner circumference of the disc is provided with the notches 10 for receiving the ends of the thick part 5 which act to prevent the turning movement of the disc. A brake lining 11 is placed on the outer face of the disc for engaging the ring-shaped disc 12 which is fastened to the wheel. A shaft 13 is suitably journaled in a part carried by the axle housing and this shaft has the cam members 14 thereon for engaging the disc 7 when the shaft is rotated to force the disc against the disc 12 and thus set up a braking action. A rod 15 is connected to an arm 16 on the shaft and this rod can be connected to a brake pedal or lever so that the brake can be applied by the operator of the vehicle.

It will be seen that the springs 9 act to hold the disc 7 and its lining away from the disc 12 so that the two discs are free of each other and thus the wheel can rotate without interference on the part of the brake but as soon as the shaft is rotated, the cam members will move the disc 7 bodily against the disc 12 and thus stop the rotation of the wheel.

This invention will give full brake surface at any applied pressure and the clearance is much greater than on the band type, now in use. This will eliminate dragging. It will also give full braking effect on backward movement as well as forward movement. While the drawings show the braking surfaces as being flat, it will, of course, be understood that these surfaces may be of other shapes. For instance, they may be of cone shape.

It is thought from the foregoing description that the advantages and novel features of my invention will be readily apparent.

I desire it to be understood that I may make changes in the construction and in the combination and arrangement of the several parts, provided that such changes fall within the scope of the appended claim.

For instance, the brake can be applied to the front wheels of a vehicle as well as the back wheels and the braking pressure may be set up by any desired means, such as by hydraulic pressure, gears, angle irons or the like. The brake may be made up of different shapes as it need not be a disc, as shown, and it may be enclosed in a case to protect it from dirt.

What I claim is:—

A vehicle brake comprising a ring-shaped braking member surrounding the hub of a wheel, a cross piece supported by the axle housing of the wheel, a second member of ring shape, pins carried thereby and passing through the cross piece, springs on the pins for holding the second member out of engagement with the first member, parts of the cross piece engaging parts of the second member for preventing rotation of the second member and means for forcing the second member against the first member.

In testimony whereof I affix my signature.

HARRY GORDON COLE.